March 22, 1966 C. L. AUERNHEIMER 3,242,441
FILTERED SEMI-CONDUCTOR RESONANT FEEDBACK OSCILLATOR
Filed April 19, 1963
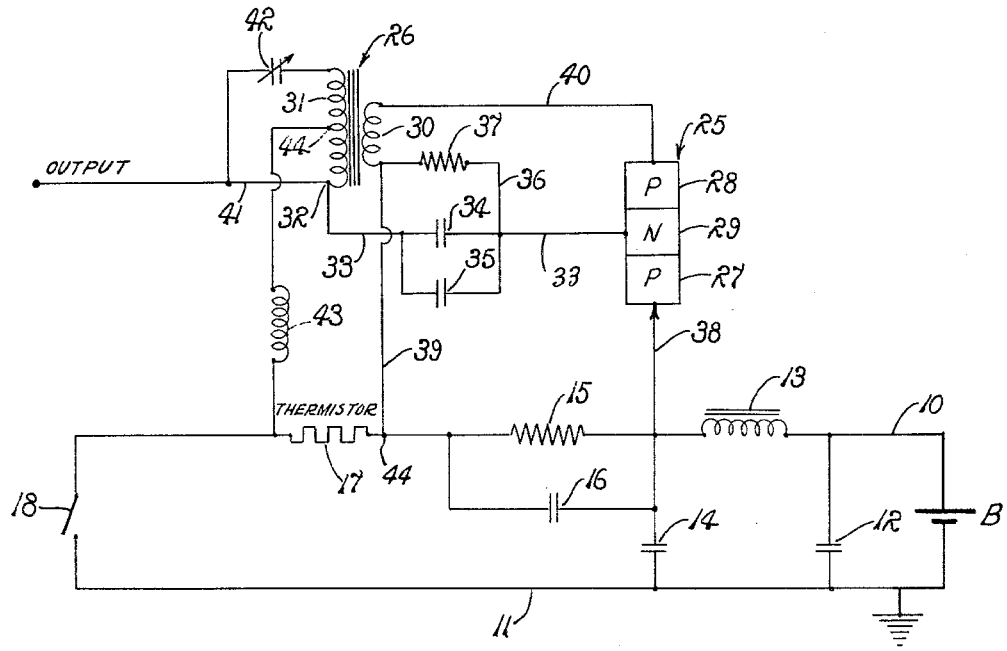
CLARENCE L. AUERNHEIMER
INVENTOR
HUEBNER & WORREL
ATTORNEYS
BY
Richard M. Worrel United States Patent Office 3,242,441
Patented Mar. 22, 1966

3,242,441
FILTERED SEMI-CONDUCTOR RESONANT
FEEDBACK OSCILLATOR
Clarence L. Auernheimer, Fresno, Calif., assignor to A.V.
Electronics, Inc., Fresno, Calif., a corporation of
California
Filed Apr. 19, 1963, Ser. No. 274,115
7 Claims. (Cl. 331—117)

The present invention relates to a filtered semiconductor feedback oscillator for the conversion of direct current to alternating current, and more particularly to a feedback oscillator which avoids feedback to a direct current power source, excludes alternating current components from the source and provides substantially stable operational characteristics at ambient temperatures.

It is well known that devices which operate from sources of direct current often require oscillators and vibrators to change the direct current into alternating current for various purposes. As an example, a tape recorder usually employs alternating current in its recording circuitry, but especially requires high frequency alternating current to erase previously recorded impulses. A tape recorder operating from a direct current source must therefore have a high frequency oscillator system to convert the direct current for this purpose.

The present invention has particularly advantageous use in connection with teaching laboratories and is conveniently described in such illustrative environment although not limited thereto. The teaching of foreign languages is now being accomplished on a wide scale by means of laboratories equipped to transmit recorded messages emanating from console locations through various feed lines to a plurality of student stations. The simplest of such laboratory systems provides the student with nothing more than headphones and an amplifier in order that he may listen to a master recording or other instructional source. A more elaborate and useful system provides the student with a microphone so that he may respond or record his reaction for subsequent listening and/or criticism. In this system he can hear himself in his own headphones as well as the message or instructional material from the source. It involves a tape recording device in order that the instruction and message from the source can be recorded and the student's response can also be recorded. The student may review his response and also may remove part or all of his response and re-respond until he is satisfied that he has mastered the response properly. In this system, a tape eraser is provided and a high frequency alternating current is required for such purpose. However, it is preferred that the teaching laboratory be operated from a low voltage direct current source to minimize student hazard.

In one such teaching system, all of the student stations and the instructor's console are powered from a single B+ voltage of low intensity. A high frequency alternating current is then generated at the place of need. This is done by an oscillator. However, it is difficult to keep an oscillator frequency generating device which is powered by a direct current line from feeding back upon the direct current line as an imposed alternating current. So long as only one such station is employed and the frequency is at high level beyond the audio range, there is no appreciable problem. However, when two or more such stations are operating at one time and frequencies are out of phase with each other, they produce a resultant frequency difference (heterodyne) imposed upon the direct current line which is well within the audio range.

The audio system at the student stations is not connected to receive audio signals from the power line and it is not intended that such system pick up signals from the power line. Nevertheless, if operative power is received from the power line, and if the impedance of the power supply system is high, or the power of the signal imposed upon the line is sufficiently high, it feeds into the receivers of the student stations and is heard as an audible signal.

This invention prevents an audio range, superimposed frequency from entering into the oscillator generating system where it can be mixed with the desired frequency output of the oscillator. Also, this invention prevents the desirable, generated high frequency output oscillations from feeding back into the direct current system.

An object of the present invention, therefore, is to provide an improved high frequency alternating current from a low voltage direct current source.

Another object is to provide an oscillator adapted for connection to a source of direct current and which shields the source from alternating current feedback.

Another object is to provide an oscillator adapted for connection to a source of direct current which effectively rejects or obstructs the reception of superimposed alternating current from the source.

Another object is to make possible the provision of a teaching laboratory system having a plurality of student stations and requiring a high voltage alternating current which is powered from a source of direct current of low intensity, such as a B battery.

A further object is to provide an oscillator having substantially stable operational characteristics at ambient temperatures.

Further objects and advantages will become apparent in the subsequent description in the specification.

The preferred embodiment of the present invention for accomplishing these objects is illustrated in the single figure of the drawing. Reference numeral 10 refers to a feed line from any suitable source of power for low voltage direct current, such as a B battery. A ground line 11 feeds to a common earth ground. The system involves a series supply and control circuit with a filtered input and filtered output, with the oscillator system supplied by and controlled by this circuit.

To protect against surges, the feed line 10 is grounded through a bypass condenser 12. A choke 13 is provided in the feed line and the feed line is grounded through a condenser 14 immediately thereafter which constitutes a radio frequency bypass. A resistor 15 is connected in the feed line 10 in series with the choke 13. A condenser 16 grounds the feed line immediately after the resistor 15. A thermistor 17 is connected in the feed line in series with the resistor 15 and to the ground line 11 through a control switch 18.

High frequency oscillating voltage is generated preferably by a P-N-P type of transistor 25 and a stepup transformer 26 operating in a resonant circuit. The transistor 25 is provided, as usual with such devices, with an emitter 27, a collector 28 and a base 29. The transformer 26 has a primary winding 30 and a secondary winding 31. At a junction 32 on the secondary winding, a line 33 extends to the base 29 of the transistor through parallel condensers 34 and 35, which serve as direct-current-blocking condensers as well as providing resonant tuning. The base is connected to the primary 30 by a line 36 through a resistance 37, which serves to impart a forward bias to the base 29. The thermistor 17, the transformer 26, and the transistor 25 are positioned in physical proximity so that the thermistor can sense temperature variations in the transformer and transistor.

A line 39 connects the primary 30 to the feed line 10 at a junction 43 intermediate the resistor 15 and the thermistor 17. The opposite end of the primary is connected by conductor 40 to the collector 28 of the transistor 25 so that the primary serves as a load for the collector.

An output line 41 is connected to the end of the secondary 31 to which the line 33 is connected. A variable tuning condenser 42 interconnects the opposite end of the secondary and the output line 41 leading to an audio device having a predetermined inductance, such as an audio teaching system, not shown. An inductance coil 43 interconnects a center tap 44 of the transformer and the lead line 10 at a position following the thermistor 17. The coil 43 serves to supplement the teaching system inductance by causing the current to lag the output voltage and thereby improving the sine wave characteristics of the audio signal fed to the teaching system.

When the switch 18 is first closed to set the circuit in operation, a surge wave sweeps through the system causing a sudden build-up of voltage in the primary 30 of the transformer 26. This voltage is stepped up to a higher voltage by the secondary 31 and fed back through line 33 and condensers 34 and 35 to the base 29 of the transistor 25, whereupon oscillations commence in the circuit. The signal imposed upon the base is then amplified by the transistor. Power is supplied through the line 38 from the feed line 10 to the transistor emitter 27. This amplified signal from the transistor collector 28 is imposed upon the transformer primary 30 to induce an alternating current output voltage in the secondary at junction 32, from which the voltage is continuously fed back to the transistor base 29. The oscillations increase rapidly as a result of this continuous in-phase voltage feedback until the system becomes resonant.

The frequency of resonance can be controlled by the character of the condensers 34 and 35, the character of the transformer, and other factors as will be readily appreciated by those skilled in the art. The transistor 25 is not driven into saturation, but instead remains a linear amplifier. The combined capacitance of condensers 34 and 35 determines the transistor base voltages effectively to control the frequency of oscillation. For relatively lower combined totals, the frequency is higher; for higher totals, the frequency is lower.

The system provides two series circuits for tuning the oscillations to resonant frequency. Both circuits include a feedback connection from junction 32 to the base 29, leading through line 33 and condensers 34 and 35. One of the circuits also includes line 40, primary 30, collector 28, line 39, thermistor 17 and coil 43. The other circuit includes line 38, emitter 27, thermistor 17 and coil 43. The voltage in lines 38 and 39 is substantially equal, in view of their being coupled by bypass condenser 16. In either circuit, the inductance coil 43 provides a degree of series inductance for the output signal so as to cause the current to lag the output voltage slightly and thereby to enhance the sine wave characteristics of the output signal.

At resonant frequency, the waveform at the output appears as a distorted sine wave having third harmonic distortion. The waveform at the collector 25 is substantially similar to that at the output, reduced in amplitude. The waveform at the base 29 is also similar to that at the output but includes fifth harmonic distortion due to the current leading the voltage through condensers 34 and 35. The variable condenser 42 is supplied for fine tuning of the transformer frequency.

As described, the system prevents the input of imposed alternating current from the source and will not allow the feedback of high frequency alternating current into the supply line. The filtering of the alternating current is accomplished in both directions by the filter composed of the choke 13 and condensers 12 and 14, together with the resistor 15 and the condenser 16, for alternating current signals attempting to enter into the system.

Another important feature of the present invention is provided by the use of the thermistor 17 to prevent thermal runaway. The thermistor is also used to compensate for ordinary temperature fluctuations.

Condensers 34 and 35 have opposite temperature response characteristics and assist in temperature control.

The condenser 34 is a coaxial-cylinder capacitor having a paper dielectric whereas condenser 35 is a parallel plate capacitor having a silver mica dielectric. Such silver mica condensers have a tendency with heat to increase in value and lower the frequency of the resonant circuit. The paper condenser has a tendency with heat to decrease in value and raise the resonant frequency. By selecting the proper values of each of these units is a very accurate frequency is maintained over the range of 10° to 140° F. This range will be readily appreciated to be within the maximum limits of human comfort and any teaching laboratory operated without this range will be very unusual. The condensers 34 and 35 are located in heat transmitting proximity to take utmost advantage of their compensating properties. They materially aid in maintaining an output equilibrium.

The transistor 25 is subjected to the variable voltage of the junction between thermistor 17 and resistor 15 by the tying of the base 29 to this junction through line 39 and resistance 37. The thermistor is positioned in such physical proximity to the transistor 25 and the transformer 26 that heat is readily transmitted therebetween and hence responds quickly to temperature changes in either the transistor or transformer and makes suitable adjustments in the output of the transistor. Such thermistor location prevents thermal runaway because as the transistor or transformer starts to overheat, the thermistor drops in value so rapidly that the transistor is slowed to a safe value in order that heating buildup is halted.

In order to facilitate heat transfer between the condensers 34 and 35 and between the transformer 26, transistor 25 and thermistor 17, these components are grouped in close physical proximity and mounted on a sheet of relatively heavy aluminum or other efficient heat conducting material.

In order to complete an illustration of the preferred embodiment of the invention, the table below sets forth the values for the elements illustrated as actually employed for a working system.

| Article | Reference No. | Value |
| --- | --- | --- |
| Condenser | 12 | 30 microfarads. |
| Choke | 13 | 1 ohm. |
| Condenser | 14 | .001 mfd. |
| Resistor | 15 | 220 ohms. |
| Condenser | 16 | 10 mfd. |
| Thermistor | 17 | 9.6 ohms at 68° F. to 8 ohms at 140° F. |
| Transistor | 25 | |
| Transformer | 26 | |
| Condenser | 34 | .001 mfd. |
| Do | 35 | .0015 mfd. |
| Resistor | 37 | 1,200 ohms. |
| Variable Condenser | 42 | 20–225 micromicrofarads. |
| Choke Coil | 43 | 800 microhenries. |

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A filtered temperature-stable feedback oscillator comprising a transformer having a primary and a secondary; a transistor having an emitter, a collector, and a base; means connecting the primary of the transformer and the collector of the transistor; a resistance connected between the primary of the transformer and the base of the transistor; a pair of condensers of substantially matching capacities connected to the secondary of the transformer and to the base of the transistor, one of the condensers being a coaxial-cylinder capacitor and other being a parallel-plate capacitor, said condensers being in heat transmitting proximity to each other; a source of direct current; a choke; a resistor; a feed line interconnecting the choke and resistor electrically in series between the source of direct current and the primary of the transformer; a line interconnecting the emitter of the transistor and the feed line between the choke and the resistor; a condenser grounding the feed line between the choke and the source of direct current; a condenser grounding the feed line between the choke and the resistor; a condenser grounding the feed line between the resistor and the primary of the transformer; an output line connected to the secondary of the transformer; a variable condenser connected between the output line and the end of the secondary opposite to the output line; a thermistor connected to the feed line between the resistor and the primary; a coil connected in series with the thermistor and to midpoint on the secondary, and a switch for grounding the coil and the thermistor at a position therebetween.

2. The oscillator of claim 1 wherein the coaxial-cylinder capacitor has a paper dielectric and the parallel plate capacitor has a mica dielectric.

3. The feedback oscillator of claim 1 wherein the thermistor, resistor, feed line and grounded switch provide a voltage divider connected across the source of direct current and having a junction in the feed line, between the thermistor and resistor; and the thermistor, transformer, and transistor are positioned in physical proximity so that the thermistor can sense temperature variations in the transformer and transistor and thereby adjust the voltage at said junction, whereby the thermistor in cooperation with the voltage divider provides thermal control to keep the collector voltage regulated and to prevent thermal runaway.

4. A filtered semi-conductor feedback oscillator comprising a transformer having a primary and a secondary; a transistor having an emitter, a collector, and a base; a line connecting the primary to the collector; condenser means connected between the secondary and the base; first resistance means connected between the primary and the base; a source of direct current; voltage divider means connected across said source including a thermistor having first and second opposite contact ends, second resistance means connected to the first end of the thermistor in series, and a line connected between the first end of the thermistor and the second resistance means and leading to the primary, said thermistor being in heat transmitting proximity to the transformer; Pi filter means connected between the emitter, the voltage divider means and across the source of direct current; conductive means connecting the secondary to the second end of the thermistor; and an output line leading from said secondary.

5. The oscillator of claim 4 wherein a line connects the second end of the thermistor to ground; the Pi filter comprises a choke having one end connected between the emitter and voltage divider and a second end connected to the source of direct current; and a pair of condensers connected between said ground line and the respective opposite ends of the choke.

6. A feedback semiconductor oscillator comprising a transformer having a primary and a secondary; a transistor having a base, an emitter, and a collector; a source of direct current connected to the emitter; conductive means connecting the collector to the primary; first condenser means having substantially uniform capacity at ambient temperature connected between the secondary and the base; first resistance means connected between the secondary and the emitter; second condenser means connected in parallel with said resistance means whereby the first condenser means, the secondary, the first resistance means and second condenser means in parallel, the emitter and the base are operably associated in series to provide a series resonant circuit; second resistance means connected between the primary and the base to provide a forward bias on the base; and an output line connected to the transformer secondary.

7. A feedback semiconductor oscillator comprising a transformer having a primary and a secondary; a transistor having a base, an emitter, and a collector; a source of direct current connected to the emitter; condenser means having substantially uniform capacity at ambient temperature connected between the secondary of the transformer and the base of the transistor; a thermistor in heat transmitting proximity to the transformer and the transistor connected between the secondary and the primary; a line connecting the primary to the collector, whereby the secondary, the thermistor, the transistor, the primary, the collector, the base and the condenser means are connected in series to provide a series resonant circuit; resistance means connected between the primary and the base to effect a forward bias on the base; and a line to output connected to the transformer secondary.

References Cited by the Examiner

UNITED STATES PATENTS

| 2,791,693 | 5/1957 | Moore | 331—117 X |
| 2,941,159 | 6/1960 | Edelman | 331—113 |
| 3,057,356 | 10/1962 | Greatbatch | 331—112 X |

ROY LAKE, *Primary Examiner.*

NATHAN KAUFMAN, *Examiner.*

S. H. GRIMM, *Assistant Examiner.*